(12) United States Patent
Chang et al.

(10) Patent No.: US 7,224,718 B2
(45) Date of Patent: May 29, 2007

(54) SLOT SYNCHRONIZATION FOR A CDMA SYSTEM

(75) Inventors: Chun-Jung Chang, Taipei (TW); Che-Li Lin, Taipei (TW)

(73) Assignee: BenQ Corporation, Gueishan, Tao-Yuan Hsien (TW)

( * ) Notice: Subject to any disclaimer, the term of this patent is extended or adjusted under 35 U.S.C. 154(b) by 777 days.

(21) Appl. No.: 10/462,795

(22) Filed: Jun. 17, 2003

(65) Prior Publication Data

US 2004/0258182 A1 Dec. 23, 2004

(51) Int. Cl.
*H04B 1/00* (2006.01)
(52) U.S. Cl. ..................................... 375/145
(58) Field of Classification Search ............... 375/145, 375/142, 143, 144, 150, 152
See application file for complete search history.

(56) References Cited

U.S. PATENT DOCUMENTS

| | | | |
|---|---|---|---|
| 5,910,948 A | 6/1999 | Shou et al. | |
| 5,930,366 A | 7/1999 | Jamal et al. | |
| 6,038,250 A | 3/2000 | Shou et al. | |
| 6,064,690 A | 5/2000 | Zhou et al. | |
| 6,226,315 B1 | 5/2001 | Sriram et al. | |
| 6,363,060 B1 | 3/2002 | Sarkar | |
| 6,603,979 B1* | 8/2003 | Hirsch | 455/502 |
| 6,822,999 B1* | 11/2004 | Lee et al. | 375/145 |
| 6,834,046 B1* | 12/2004 | Hosur et al. | 370/335 |
| 6,961,565 B2* | 11/2005 | Tanno et al. | 455/434 |
| 7,039,036 B1* | 5/2006 | Dabak et al. | 370/342 |
| 2001/0021199 A1* | 9/2001 | Lee et al. | 370/503 |
| 2003/0012270 A1* | 1/2003 | Zhou et al. | 375/150 |
| 2003/0220755 A1* | 11/2003 | Darbel et al. | 702/89 |

OTHER PUBLICATIONS

Yi-Pin Eric Wang, Tony Ottoson, "cell Search in W-Comm", IEEE Journal on Selected Areas in Communications, vol. 18, N 2000.
3 GPP TS 25,213 V3,8, 0.
3 GPP TS 25,214 V3,10,0.

* cited by examiner

Primary Examiner—Emmanuel Bayard
(74) Attorney, Agent, or Firm—Winston Hsu

(57) ABSTRACT

A wireless system broadcasts data in frames, each frame having F slots. Output from a matched filter is used to combine K slots to generate profile data, where K is less than F. N peak values respectively from n peak positions are selected from the profile data, where n is greater than one. A correlator is employed, together with the n peak positions and S slots subsequent the K slots, to generate n×S correlation values. Respective combination values for the n peak positions are generated by coherently combining the correlation values, and combining the coherent combination results with the non-coherent n peak values. The combination values are respectively used to generate SNR values for each of the n peak positions. The peak position having the best respective SNR value is then selected as a slot synchronization position.

19 Claims, 8 Drawing Sheets

SLOT SYNCHRONIZATION FOR A CDMA SYSTEM

CROSS REFERENCE TO RELATED APPLICATIONS

BACKGROUND OF INVENTION

1. Field of the Invention

The present invention relates to slot synchronization in a wideband code division multiple access (WCDMA) system. More specifically, the use of both matched filters and correlators to obtain more accurate slot timing results is disclosed.

2. Description of the Prior Art

Spread spectrum communication systems are becoming increasingly important in cellular networks. In particular, wideband code division multiple access (WCDMA) systems are entering the marketplace, and offer the potential of significantly increased performance and reliability.

To establish a network connection in a WCDMA system, the user equipment (UE) must first perform a cell search procedure. The cell search procedure enables the UE to obtain timing and code synchronization for the downlink channel. Various methods are known in the prior art for performing a cell search procedure. Attention is drawn, for example, to the article "Cell Search in W-CDMA" by Yi-Pin Eric Wang and Tony Ottosson in Vol.18, No.8 (August 2000 edition) of *IEEE Journal on Selected Areas in Communications*, which is included herein by reference.

A simple overview of cell searching is presented in the following. Please refer to FIG. 1. FIG. 1 is a block diagram of a downlink Common Control Channel (CCH) 10 in a WCDMA system. The CCH 10 is broken up into a series of frames 12. Each frame 12 contains fifteen slots 14. Each slot 14 holds ten symbols, each of 256 chips. Hence, each slot 14 is 2560 chips in length. Please refer to FIG. 2 in conjunction with FIG. 1. FIG. 2 is a block diagram of a slot 14 in the CCH 10. The first 256 chips 16 in each slot 14 holds a primary synchronization channel (PSCH) 16*p* and a secondary synchronization channel (SSCH) 16*s*. The PSCH 16*p* and SSCH 16*s* are orthogonal to each other, and hence can be broadcast on top of each other. The PSCH 16*p* chip coding is the same for all base stations, and does not change. The SSCH 16*s* chip coding changes with every slot 14 according to a predefined pattern that repeats every frame 12. Please refer to FIG. 3. FIG. 3 is a block diagram of a common pilot channel (CPICH) 20 broadcast with the CCH 10. The coding used for the CPICH 20 is unique to the broadcasting base station. In a WCDMA system, a base station can use one of 512 different codes for the CPICH 20, which are broken into 64 code groups, each having 8 respective codes. The coding of the PSCH 16*p* is common across all base stations, and can thus be used for slot 14 synchronization. Although the coding of the SSCH 16*s* changes on a slot 14 by slot 14 basis, the sequence pattern of code change of the SSCH 16*s* is determined by the code group into which the code used for the CPICH 20 lies. That is, there are 64 code sequence patterns for the SSCH 16*s* to follow, each of which corresponds to a particular code group associated with the code used for the CPICH 20. By correlating the received CCH signal 10 with all possible SSCH 16*s* code sequences and identifying the maximum correlation value, it is possible to learn the code group of the CPICH 20, and to obtain frame 12 synchronization. This is due to the fact that the SSCH 16*s* changes according to a predefined sequence, the starting sequence of which is known and which is sent at the beginning of every frame 12, thus enabling frame synchronization. Once the code group of the CPICH 20 is learned, it is possible to obtain the primary scrambling code used by the cell by performing symbol-by-symbol correlation over the CPICH 20 with all eight of the codes in the code group identified for the CPICH 20. Once the primary scrambling code used by the base station has been identified, system and cell specific broadcast channel (BCH) information can be read.

Based upon the above, cell searching is thus typically broken into the three following steps:

Step 1: Slot synchronization.
  Utilize the PSCH 16*p* to perform slot synchronization. This is typically done with a matched filter (or similar device) that is matched to the PSCH 16*p* that is common to all base stations. Slot timing is obtained from peaks in the matched filter output.

Step 2: Frame synchronization and code group identification.
  The slot timing obtained in step 1 is used to correlate the SSCH 16*s* with all possible SSCH code sequences. The maximum correlation identifies the code group of the CPICH 20. The SSCH 16*s* having the first SSCH code sequence identifies the start of a frame 12.

Step 3: Scrambling code identification.
  Symbol-by-symbol correlation is performed on the CPICH 20 for all eight codes within the code group identified in step 2. The maximum correlation value identifies the primary scrambling code of the base station.

Please refer to FIG. 4. FIG. 4 is a simple block diagram that illustrates cell synchronization for a prior art UE 30. Of course, the UE 30 will contain many more components than those shown in FIG. 4, which is restricted to the present discussion. The UE 30 includes a transceiver 39 and a synchronization stage 38. The transceiver 39 receives broadcasts from a base station (not shown) and passes broadcast data to the synchronization stage 38 in a manner familiar to those in the art of wireless devices. The synchronization stage 38 includes a stage 1 31, a stage 2 32 and a stage 3 33. The stage 1 31 performs the slot synchronization of step 1 discussed above. Results from stage 1 31 are passed to stage 2 32, which performs the frame 12 synchronization and code group identification of step 2. Results from stage 2 32 are then passed on to stage 3 33, which performs the scrambling code identification of step 3. Stage 1 31 includes a peak profiler 34. The peak profiler 34 contains the primary synchronization code 35 that is common to all base stations, and generates peak profile data 36 that is obtained by matching the primary synchronization code 35 against the PSCH 16*p* received from the transceiver 39. The profile data 36 holds data for a predetermined number of chips, and as the PSCH 16*p* repeats with every slot 14, it is common to hold enough data to cover an entire slot 14, i.e., 2560 chips. The chip in the profile data 36 having the highest peak profile is assumed to mark the PSCH 16*p*, and is thus used as the PSCH path position 37. This is illustrated in FIG. 5, which is an example graph of peak profile data 36 (not to scale). Stage 1 31 notes that in the profile data 36 a maximum valued peak occurs at chip number 1658. The PSCH path position 37 would thus hold a value indicative of the peak path position at chip 1658. The PSCH path position 37 is forwarded to stage 2 32 as the slot 14 synchronization point. Utilizing the slot 14 position marked by the PSCH path position 37, stage 2 32 performs step 2 outlined above to generate a code group value 32*g*. Stage 2 32 will also generate a slot number 32*s*, which indicates the number of the slot 14 in its respective frame 12 that was marked by the PSCH path position 37. As there are fifteen slots 14 in a frame 12, the slot number 32s could be a value that runs, for example, between zero and fourteen. In this manner, frame 12 synchronization is performed. Finally, the results from stage 2 32 are passed on to stage 3 33, which subsequently performs step 3 to generate a primary scrambling code 33p for the CPICH 20.

The typical prior art method for performing the above step 1 is to pass the received signal from the transceiver 39 through a square-root raised cosine (SRRC) filter 34s. Output from the SRRC 34s is then fed into a matched filter 34m that matches against the primary synchronization code 35 to generate the profile data 36. As there are fifteen slots 14 per frame 12, the stage 1 31 will generally accumulate fifteen slots 14 for the profile data 36, and then select the largest peak in the profile data 36 as the PSCH path position 37. Hence, the matched filter 34m must operate on at least fifteen slots 14 to generate the profile data 36. The matched filter 34m, however, draws a significant amount of power, and thus is a source of reduced battery times for the UE 30. In addition, frequency uncertainty in the UE 30 can adversely affect the PSCH path position 37 selected by the prior art method of the stage 1 31.

SUMMARY OF INVENTION

It is therefore a primary objective of this invention to provide a slot synchronization method that utilizes a matched filter for only a portion of a frame's worth of slots, and uses correlators for the remaining slots.

Briefly summarized, the preferred embodiment of the present invention discloses a method and related device for performing slot synchronization in a wireless system. The wireless system broadcasts data in frames, each frame having F slots, F being greater than one. A primary synchronization code channel (PSCH) is present in each slot, and contains a primary synchronization code (PSCH). Output from a matched filter matched to the PSCH is used to combine K slots to generate profile data. The number of slots K combined by the matched filter is less than the number of slots F in a frame. From the profile data, n peak values respectively from n peak positions are selected, where n is greater than one; n correlators are employed, together with the n peak positions respectively and S slots subsequent the K slots, to generate n×S correlation values. Respective combination values for the n peak positions are generated by coherently combining the correlation values within one slot corresponding to each of the n peak positions according to the phase of the peak position, and combining the coherent combination results with the non-coherent n peak values. The combination values are respectively used to generate SNR values for each of the n peak positions. The peak position of one of the n peak positions having the best respective SNR value is then selected as a slot synchronization position.

It is an advantage of the present invention that by utilizing the matched filter for only a portion of a frames worth of slots, the matched filter can be turned off for the remaining slots, which conserves power.

It is a further advantage of the present invention that by coherently and non-coherently combining results from both the correlators and the matched filter, more accurate slot timing results can be achieved over using just a matched filter alone.

These and other objectives of the present invention will no doubt become obvious to those of ordinary skill in the art after reading the following detailed description of the preferred embodiment, which is illustrated in the various figures and drawings.

DETAILED DESCRIPTION

Figure 6:
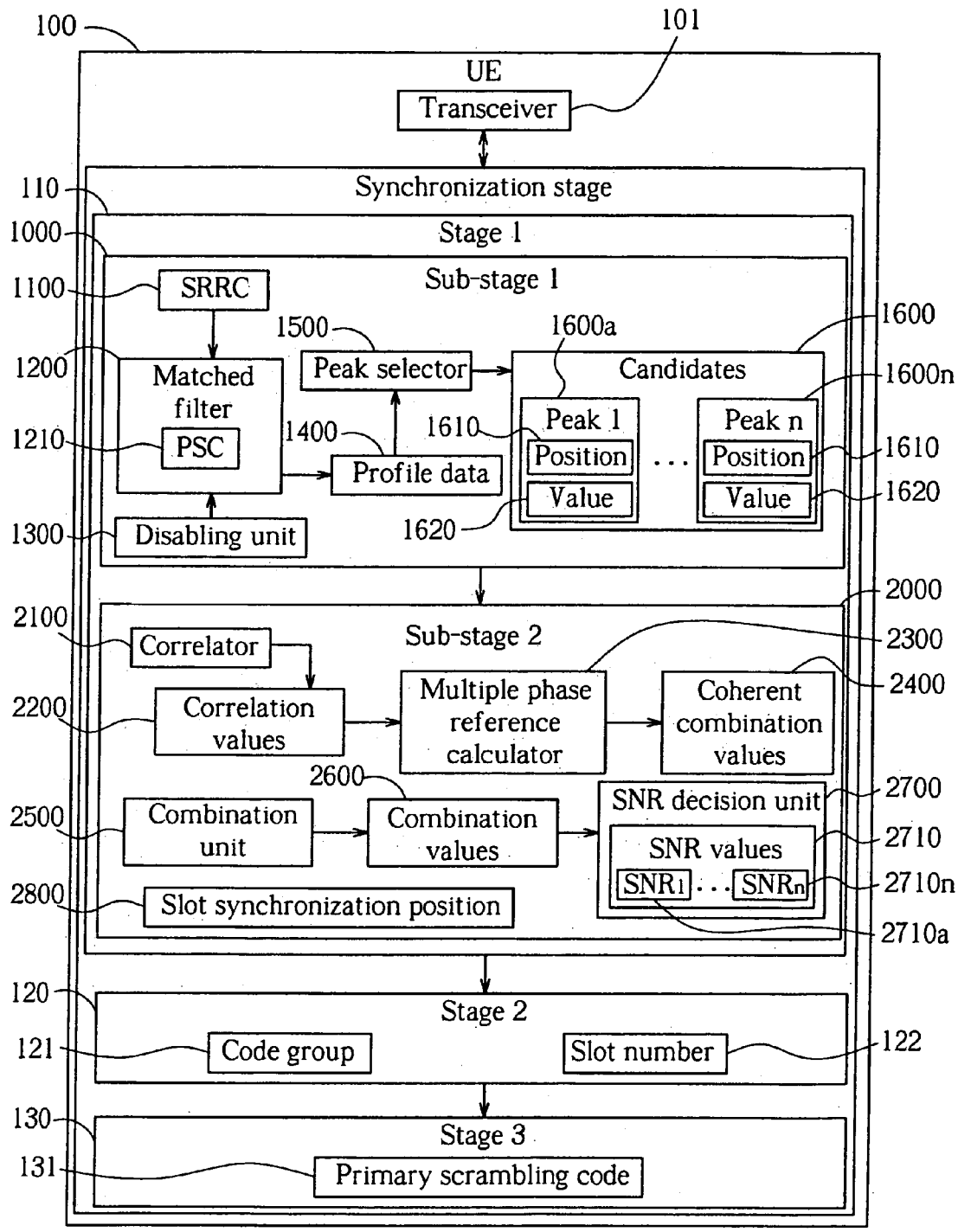
FIG. 6 is a simple block diagram of a UE according to the present invention.
Figure 7:
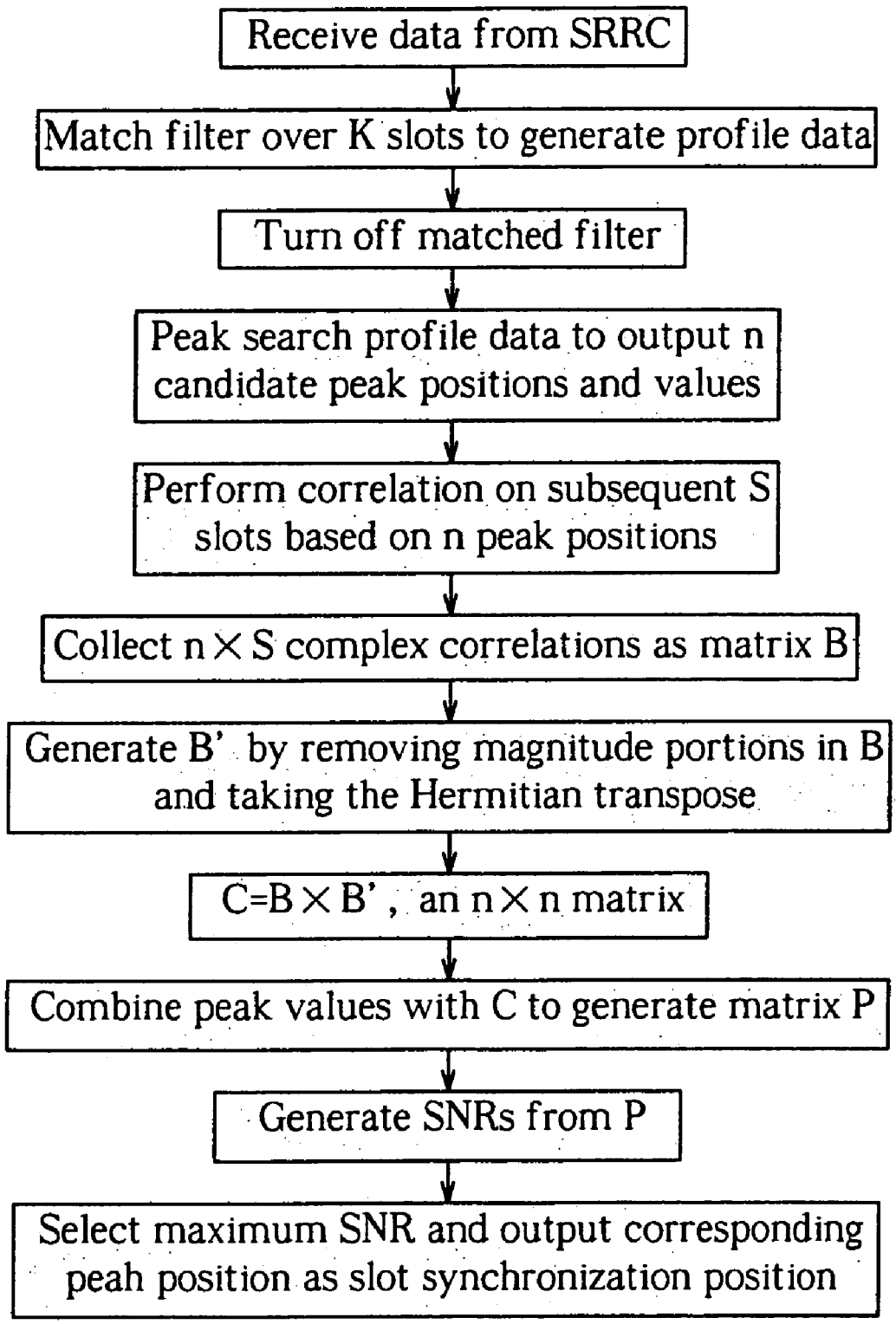
FIG. 7 is a flow chart of the present invention method as employed by the UE of FIG. 6.

Please refer to FIG. 6. and FIG. 7. FIG. 6 is a simple block diagram of a UE 100 according to the present invention. FIG. 7 is a flow chart of the present invention method as employed by the UE 100. Although not shown in FIG. 6, the various stages and units in the UE 100 may be implemented by way of a central processing unit (CPU) executing the appropriate program code to perform the method of the present invention, as detailed in the following. The arrangement of a CPU with program code to perform cell search procedures is well known in the art, and coding the present invention method should be well within the means of one reasonably skilled in the art after reading the following detailed description of the preferred embodiment. Alternatively, dedicated hardware may be used to implement some or all portions of the present invention method. Further, it should be understood that the various units and stages do not need to match the compartmental arrangement depicted in FIG. 6.

Much of the present invention UE 100 is similar to the prior art UE 30. In particular, the UE 100 includes a transceiver 101, a stage 2 120, and a stage 3 130 that are equivalent to the prior art UE 30. The stage 2 120 utilizes a slot synchronization position 2800 obtained from the stage 1 110 to generate a code group number 121, and a slot number 122, as in the prior art. The stage 3 130 utilizes the results from the stage 2 120 to obtain a primary scrambling code 131 for the CPICH 20, also as in the prior art. The present invention stage 1 110 is broken into two sun-stages: a sub-stage 1 1000, and a sub-stage 2 2000. The purpose of sub-stage 1 1000 is to generate peak candidates 1600, which are then processed by the sub-stage 2 2000 to yield the slot synchronization position 2800. While sub-stage 2 2000 is processing the peak candidates 1600 generated by sub-stage 1 1000, sub-stage 1 1000 can effectively be shut down. In particular, a disabling unit 1300 can shut down a matched filter 1200 that is used in sub-stage 1 1000 to generate profile data 1400. This helps to conserve battery resources within the UE 100.

In sub-stage 1 1000, data received from the transceiver 101 is passed through a square-root raised cosine (SRRC) filter 1100. If not already enabled, the disabling unit 1300 enables the matched filter 1200. Output from the SRRC filter 1100 is then fed into the matched filter 1200. The matched filter utilizes a PSCH 1210 that is identical to the PSCH used to encode the PSCH 16p. As noted, each frame 12 contains a certain number F of slots 14. For example, F may be fifteen. Output from the matched filter 1200 is accumulated and non-coherently combined by slot 14 to generate peak profile data 1400. The present invention sub-stage 1 1000, however, does not non-coherently combine all F slots 14 to generate the profile data 1400, as is done in the prior art method. Instead, a smaller number K of slots 14 are non-coherently combined to generate the profile data 1400. The value of K is less than that of F. For example, in frames 12 having fifteen slots 14, the matched filter 1200 may non-coherently combine ten slots 14 to generate the profile data 1400, i.e., F=15 and K=10. After all K slots 14 have been combined to generate the profile data 1400, the disabling unit 1300 disables the matched filter 1200 to conserve battery resources within the UE 100. Subsequently, a peak selector 1500 parses the profile data 1400 and selects n peaks 1600a–1600n as the candidates 1600. The value n is greater than one, and typically the n largest valued peaks in the profile data 1400 are selected. By non-coherently combining K slots 14 and outputting n peaks as candidates 1600 for the slot synchronization position 1800, in the event that the correct slot 14 boundary timing is not the largest valued peak in the profile data 1400, the present invention increases the probability of finding the correct slot timing. Each peak candidate 1600a–1600n includes a peak position 1610, which corresponds to the timing within the profile data 1400 at which the peak 1600a–1600n was found, and a peak value 1620 that corresponds to the signal strength of the peak 1600a–1600n as measured and combined by the matched filter 1200. Thus, the peak candidates 1600 holds n peak positions 1610 $q_1, q_2, \ldots, q_n$, each of which has a respectively corresponding peak value 1620 $k_1, k_2, \ldots, k_n$.

Processing then passes on to the sub-stage 2 2000, which utilizes the peak candidates 1600 and selects one of the peak positions 1620 as the slot synchronization position. Note that while the sub-stage 2 2000 is processing, the matched filter 1200 is disabled, thus conserving power. The sub-stage 2 2000 utilizes a correlator 2100 to generate correlation values 2200. The correlator 2100 uses less power than the matched filter 1200, and so an overall savings of electrical power is obtained. The correlator 2100 utilizes the n peak positions 1610 to perform a correlation procedure on the next S slots 14 after the first K slots 14. In the preferred embodiment, S=F−K. That is, a full frame's worth of slots 14 are processed, the first K being matched by the matched filter 1200, the next S be used by the correlator to generate correlation values 2200. As there are n candidates 1600, and correlation is performed over S slots 14, there are n×S complex correlation values 2200. These n×S complex correlation values 200 can be collected as an n×S matrix B. The column position of each correlation value 2200 within the matrix B may correspond to the slot position of the S correlated slots 14, and the row position may correspond to the peak candidate 1600a–1600n. For example, consider the case in which a frame 12 has fifteen slots 14. Assume that ten slots 14 are matched by the matched filter 1200, and that four candidates 1600a–1600n are selected by the peak selector 1500. In this case, F=15, K=10 and n=4. In sub-stage 2 2000, S=F−K=5, so that the next five slots 14 after those ten slots 14 processed by the matched filter 1200 are utilized by the correlator 2100 to generate 4×5=20 correlation values 2200. These correlation values 2200 may be arranged as the complex matrix B as follows:

$$B = \begin{bmatrix} P_{11} & P_{12} & P_{13} & P_{14} & P_{15} \\ P_{21} & P_{22} & P_{23} & P_{24} & P_{25} \\ P_{31} & P_{32} & P_{33} & P_{34} & P_{35} \\ P_{41} & P_{42} & P_{43} & P_{44} & P_{45} \end{bmatrix}$$

In the above, $P_{11}$ is the correlation value 2200 of the first of the candidates 1600 in the first of the S slots 14, $P_{12}$ is the correlation value 2200 of the first of the candidates 1600 in the second of the S slots 14, $P_{21}$ is the correlation value 2200 of the second of the candidates 1600 in the first of the S slots 14, and so on. Next, a new matrix B' is formed by normalizing the magnitude of each element in B and then taking the Hermitian transpose of the result. This is performed by a multiple phase reference calculator 2300. For the specific example above, the multiple phase reference calculator 2300 would thus generate results in the form:

$$B' = \begin{bmatrix} \frac{P^*_{11}}{|P_{11}|} & \frac{P^*_{21}}{|P_{21}|} & \frac{P^*_{31}}{|P_{31}|} & \frac{P^*_{41}}{|P_{41}|} \\ \frac{P^*_{12}}{|P_{12}|} & \frac{P^*_{22}}{|P_{22}|} & \frac{P^*_{32}}{|P_{32}|} & \frac{P^*_{42}}{|P_{42}|} \\ \frac{P^*_{13}}{|P_{13}|} & \frac{P^*_{23}}{|P_{23}|} & \frac{P^*_{33}}{|P_{33}|} & \frac{P^*_{43}}{|P_{43}|} \\ \frac{P^*_{14}}{|P_{14}|} & \frac{P^*_{24}}{|P_{24}|} & \frac{P^*_{34}}{|P_{34}|} & \frac{P^*_{44}}{|P_{44}|} \\ \frac{P^*_{15}}{|P_{15}|} & \frac{P^*_{25}}{|P_{25}|} & \frac{P^*_{35}}{|P_{35}|} & \frac{P^*_{45}}{|P_{45}|} \end{bmatrix}$$

Coherent combination values 2400 are then generated by the multiple phase reference calculator 2300 by multiplying B together with B', and which may be represented as an n×n matrix C. That is, C=B×B', and in the example above would have the form:

$$C = \begin{bmatrix} c_{11} & c_{21} & c_{31} & c_{41} \\ c_{12} & c_{22} & c_{32} & c_{42} \\ c_{13} & c_{23} & c_{34} & c_{43} \\ c_{14} & c_{24} & c_{34} & c_{44} \end{bmatrix}$$

Each column in C corresponds to a peak profile of one of the candidates 1600. For example, the first column in C corresponds to the first of the candidates 1600, the second column in C corresponds to the second of the candidates 1600, and so on. Each column in C represents the coherent combination of the S slots 14 based upon the corresponding phase of the peak candidate 1600a–1600n. Subsequently, a combination unit 2500 adds the previous non-coherent combination results $k_1, k_2, \ldots, k_n$ from the peak values 1620 to the coherent combination values 2400 to generate combination values 2600. Although the combination unit 2500 and multiple phase reference calculator 2300 are shown as separate entities, it should be understood that they could both be part of the same routine or physical logic block. The combination values 2600 may be represented as a matrix P, which in the above example would have the form:

$$P = \begin{bmatrix} |c_{11}|+k_1 & |c_{21}|+k_1 & |c_{31}|+k_1 & |c_{41}|+k_1 \\ |c_{12}|+k_2 & |c_{22}|+k_2 & |c_{32}|+k_2 & |c_{42}|+k_2 \\ |c_{13}|+k_3 & |c_{23}|+k_3 & |c_{34}|+k_3 & |c_{43}|+k_3 \\ |c_{14}|+k_4 & |c_{24}|+k_4 & |c_{34}|+k_4 & |c_{44}|+k_4 \end{bmatrix}$$

By combining the non-coherent results $k_1, k_2, \ldots, k_n$ from the sub-stage 1 1000 with the matrix C to form the matrix P, statistically important results are included into the peak profiles of the coherent combination matrix C.

Figure 1:
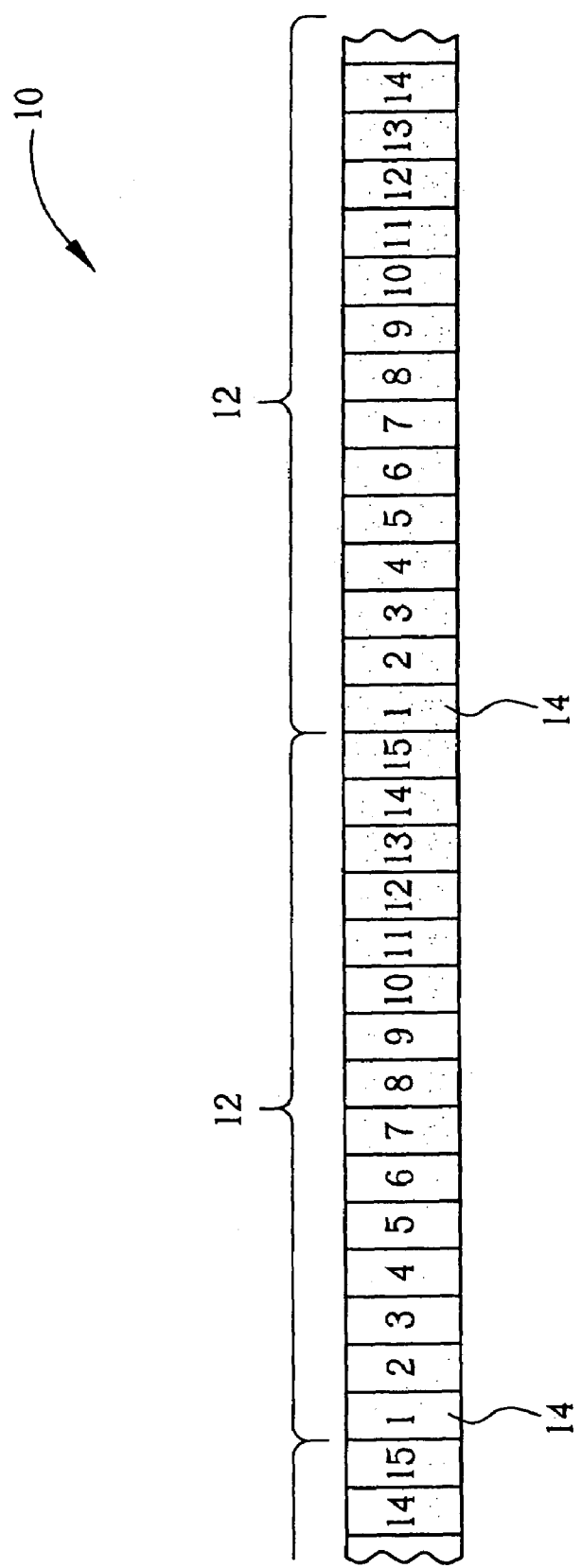
FIG. 1 is a block diagram of a downlink Common Control Channel (CCH) in a WCDMA system.
Figure 2:
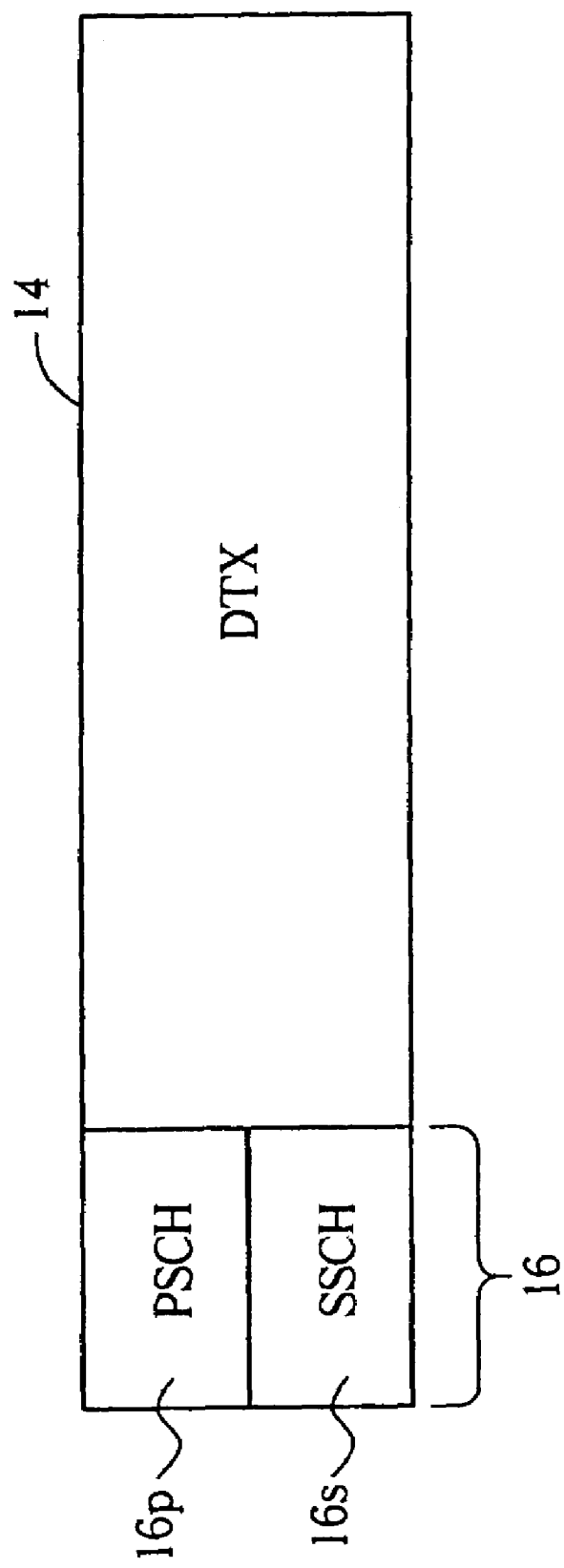
FIG. 2 is a block diagram of a slot in the CCH depicted in FIG. 1.
Figure 3:
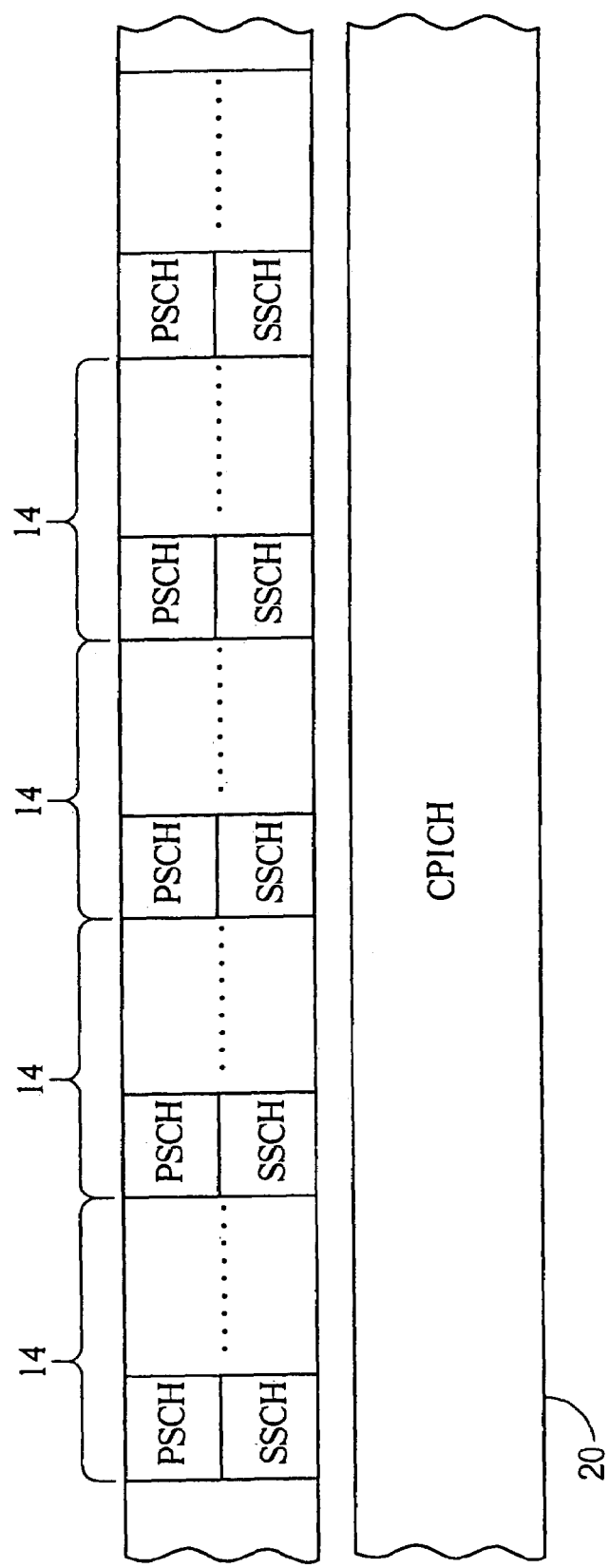
FIG. 3 is a block diagram of a common pilot channel (CPICH) broadcast with the CCH of FIG. 1.
Figure 4:
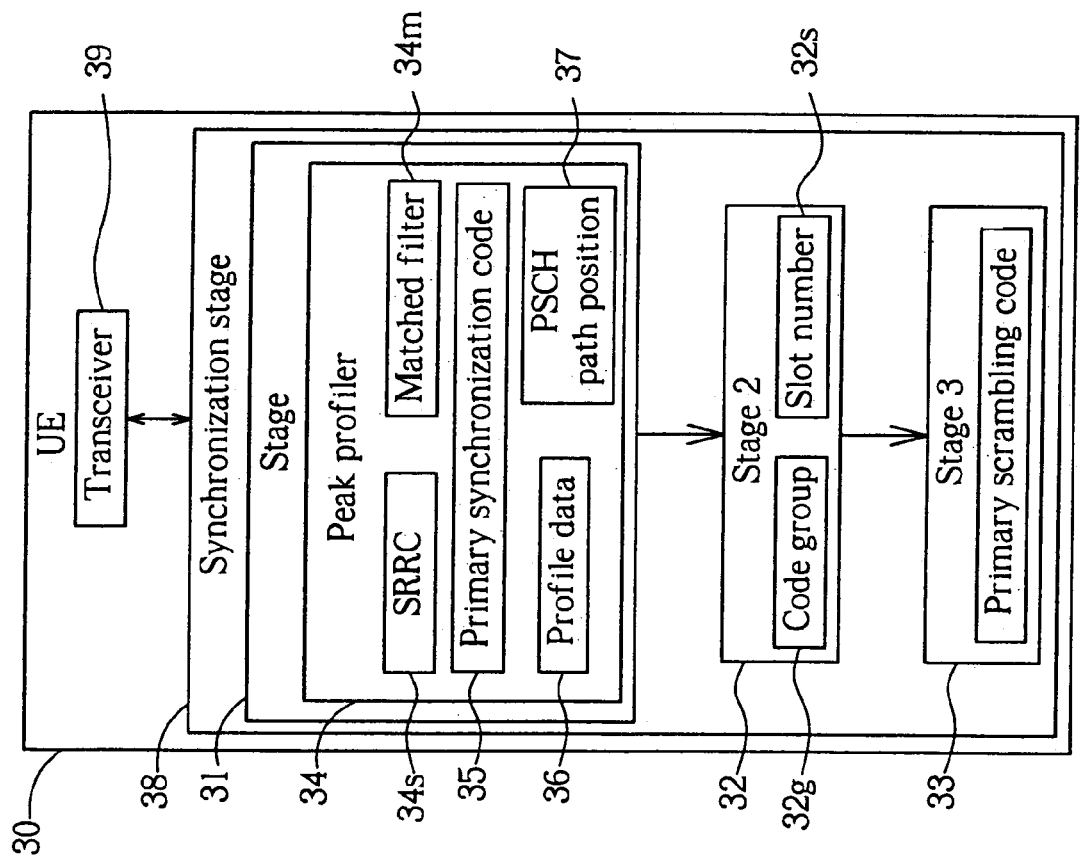
FIG. 4 is a simple block diagram that illustrates cell synchronization portions of prior art user equipment (UE).
Figure 5:
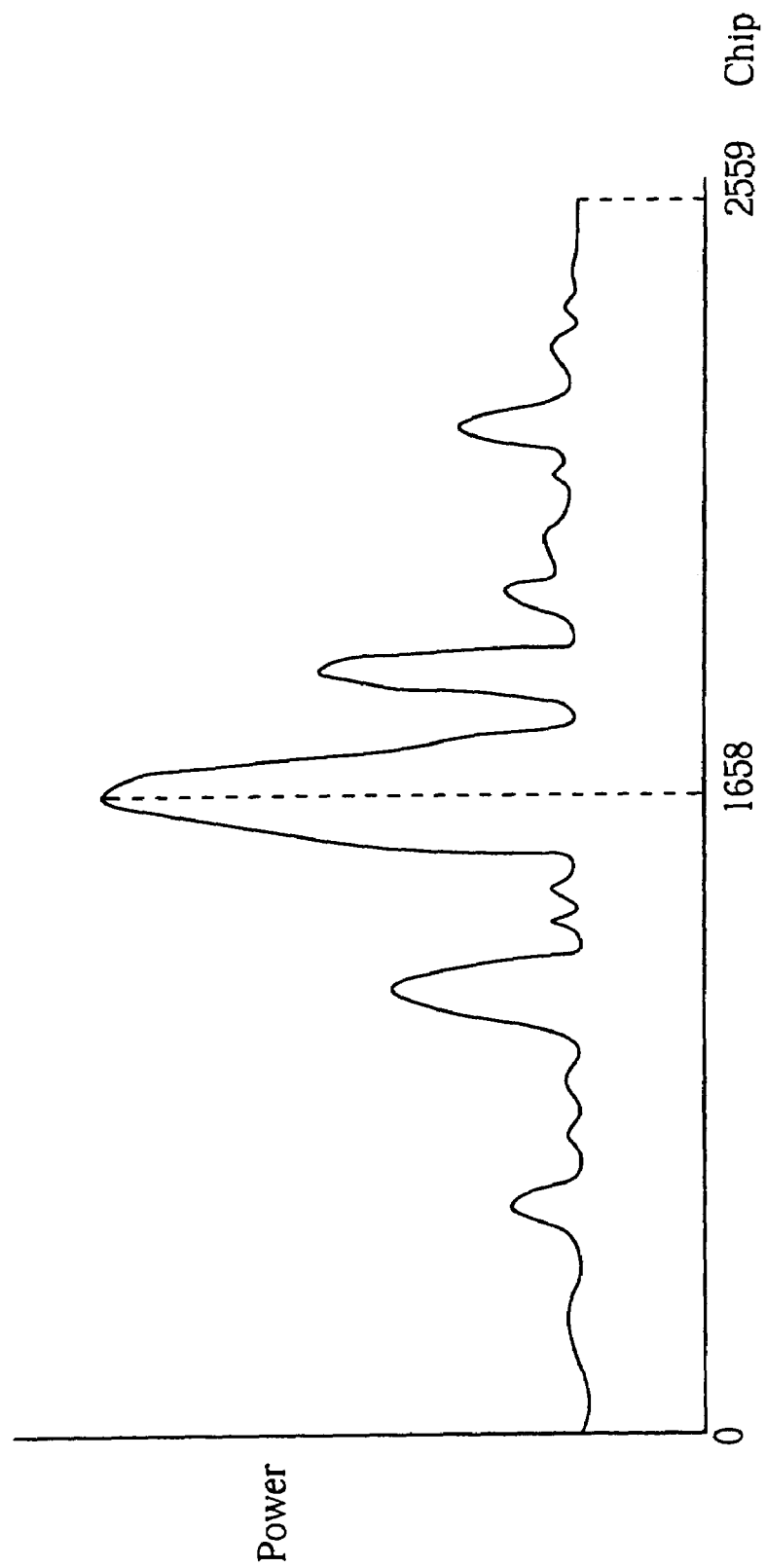
FIG. 5 is an example graph of peak profile data depicted in the UE of FIG. 4.
Figure 8:
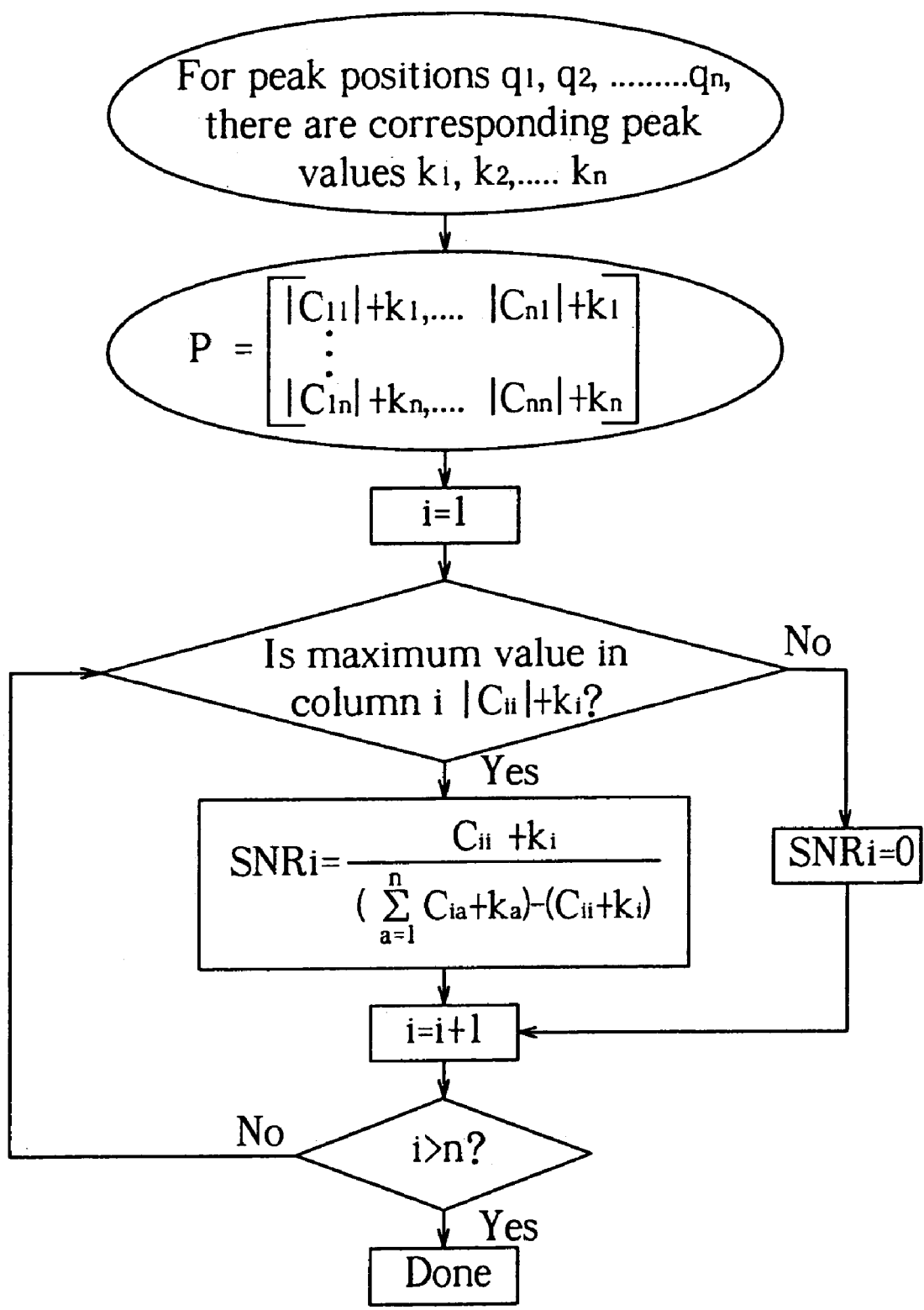
FIG. 8 is a flow chart for generating present invention SNR values from combination values indicated in FIG. 6.

Please refer to FIG. 8 with reference to FIGS. 5 and 6. FIG. 8 is a flow chart for generating SNR values from the combination values 2600, as represented by the matrix P. An SNR decision unit 2700 utilizes the combination values 2600 to generate corresponding SNR values 2710. As there are n columns in matrix P (i.e, within the combination values 2600), which respectively represent the n peak candidates 1600a–1600n, the SNR decision unit 2700 generates n SNR values 2710a–2710n, each respectively corresponding to one of the peak candidates 1600a–1600n. The diagonal elements within matrix P are the basis for coherent combination, and so they should be the largest values in their respective columns. If the value of a diagonal element in P is less than or equal to the value of any other element in that column, the associated peak candidate 1600a–1600n is considered invalid, and its associated SNR 2710a–2710n is set to zero. Otherwise, for the $i^{th}$ peak candidate 1600a–1600n, the associated $i^{th}$ SNR 2710a–2710n, $SNR_i$, is calculated by the SNR decision unit 2700 as:

$$SNR_i = \frac{c_{ii} + k_i}{\left(\sum_{a=1}^{n} c_{ia} + k_a\right) - (c_{ii} + k_i)}$$

That is, for a peak candidate 1600a–1600n having peak profile information within column "i" of the combination values 2600 (i.e., matrix P above), the associated $SNR_i$ 2710a–2710n for this peak candidate 1600a–1600n is represented as the ratio of the $i^{th}$ diagonal element in the combination values 2600 with the sum of all other elements in the $i^{th}$ column of the combination values 2600. After calculating the SNR values 2710, the SNR decision unit 2700 selects as the slot synchronization position 2800 the peak position 1610 of the peak candidate 1600a–1600n having the greatest-valued associated SNR. 2710a–2710n. That is, for n peak candidates 1600a–1600n having respective peak positions 1600a–1600n $q_1, q_2, \ldots, q_n$, there are n respective SNR values 2710a–2710n $SNR_1, SNR_2, \ldots, SNR_n$. If "m" is the index of the greatest of all the SNR values 2710, $SNR_m$, then the slot synchronization position 2800 would be set by the SNR decision unit 2700 as the peak position 1610 $q_m$. For example, if the third SNR value 2710a–2710n is the greatest of all the SNR values 2710, then the SNR decision unit 2700 would select the peak position 1610 of the third peak candidate 1600a–1600n. The slot synchronization position 2800 is then passed on to the stage 2 120, which uses the slot synchronization position 2800 to determine the code group 121 and slot number 122.

The parameters S, K and n are design choices, and should be clear to one skilled in the art without requiring undue experimentation. As a general rule, it is preferred to work on a complete frame's worth of slots, and thus the parameter S is given as S=F−K. The parameter F is fully determined by the wireless system, and so only the parameters K and n need to be considered.

In contrast to the prior art, the present invention breaks the stage 1 process for slot synchronization into two unique sub-stages. The first sub-stage utilizes a matched filter to non-coherently combine K slots and generate corresponding profile data, in which K is less than the number of slots within a frame. The matched filter is then disabled to conserve power, and a peak selector selects n peaks from the profile data as candidates that are passed to the second sub-stage. The second sub-stage utilizes a correlator, the candidate peak positions, and S slot subsequent the K slots to generate correlation values, where S+K equals the number of slots in a frame. The correlation values are coherently combined, and then non-coherently combined with the first sub-stage peak positions to generate combination values. SNR values are calculated from these SNR values, and the peak position having the greatest SNR value is selected as the slot synchronization position. By utilizing both coherent and non-coherent combination to establish slot timing, better stage 1 synchronization is obtained. Further, as the matched filter may be disabled while the second sub-stage is processing, power is conserved, which can lead to longer battery duration for the UE.

Those skilled in the art will readily observe that numerous modifications and alterations of the device may be made while retaining the teachings of the invention. Accordingly, the above disclosure should be construed as limited only by the metes and bounds of the appended claims.

What is claimed is:

1. A method for performing slot synchronization in a wireless system, the wireless system broadcasting data in frames, each frame broken into F slots, wherein F is greater than one and a primary synchronization code channel (PSCH) is present in each slot and encoded according to a primary synchronization code (PSC), the method comprising:
    utilizing output from a matched filter matched to the PSC to combine K slots to generate profile data, wherein K is less than F;
    selecting n peak values respectively from n peak positions in the profile data, wherein n is greater than one;
    utilizing at least a correlator, the n peak positions and S slots subsequent the K slots to generate n×S correlation values;
    generating respective combination values for the n peak positions by coherently combining the correlation values corresponding to each of the n peak positions according to the phase of the peak position;
    utilizing the respective combination values to generate respective SNR values for each of the n peak positions; and
    selecting as a slot synchronization position the peak position of one of the n peak positions having the best respective SNR value.

2. The method of claim 1 wherein S=F−K.

3. The method of claim 1 wherein the n×S correlation values are capable of being organized into an n×S correlation matrix with entries arranged according to slot position and peak position.

4. The method of claim 3 wherein generating the respective combination values further comprises combining respective coherent combination values corresponding to each of the n peak positions with the corresponding n peak values.

5. The method of claim 4 wherein generating the respective combination values comprises:
    normalizing the magnitude of each element in the correlation matrix;
    multiplying the normalized correlation matrix with the Hermitian of the normalized correlation matrix to generate an n×n matrix; and
    adding to each element of the n×n matrix a corresponding peak value from one of the n peak values.

6. The method of claim 5 wherein each of the n peak positions has n corresponding elements within the n×n matrix, and the SNR value for each peak position is obtained from the ratio of a diagonal entry in the n×n matrix corresponding to the peak position with the sum of all other (n−1) entries in the n×n matrix corresponding to the peak position.

7. The method of claim 6 wherein the SNR value for a peak position is set to a minimum value if any of the (n−1) entries in the n×n matrix corresponding to the peak position exceeds the diagonal entry corresponding to the peak position.

8. The method of claim 7 wherein the minimum value is zero.

9. The method of claim 1 further comprising disabling the matched filter when utilizing the correlator to generate the n×S correlation values.

10. A wireless device for performing the method of claim 1.

11. The wireless device of claim 1 further comprising a disabling unit for disabling the matched filter when the correlator bank generates the n×S correlation values.

12. wireless device capable of receiving wireless data transmitted in frames, each frame containing F slots, each slot having a primary synchronization channel (PSCH) encoded according to a primary synchronization code (PSC), the wireless device comprising:
   a matched filter matched to the PSC to combine K slots to generate profile data, wherein K is less than F;
   a peak selector for selecting n peak values respectively from n peak positions in the profile data, wherein n is greater than one;
   a correlator bank that utilizes the n peak positions and S slots subsequent the K slots to generate n×S correlation values;
   a multiple phase reference calculator for generating respective coherent combination values for the n peak positions by coherently combining the correlation values corresponding to each of the n peak positions according to the phase of the peak position;
   a combination unit for combining the coherent combination values with the n peak values to generate combination values; and
   a SNR decision unit for utilizing the combination values to generate respective SNR values for each of the n peak positions, and to select as a slot synchronization position the peak position of one of the n peak positions having the best respective SNR value.

13. The wireless device of claim 12 wherein S=F−K.

14. The wireless device of claim 12 wherein the n×S correlation values are capable of being organized into an n×S correlation matrix with entries arranged according to slot position and peak position.

15. The wireless device of claim 14 wherein the multiple phase reference calculator is capable of performing the following steps:
   normalizing the magnitude of each element in the correlation matrix; and
   multiplying the normalized correlation matrix with the Hermitian of the normalized correlation matrix to generate an n×n matrix.

16. The wireless device of claim 15 wherein the combination unit is capable of adding to each element of the n×n matrix a corresponding peak value from one of the n peak values.

17. The wireless device of claim 16 wherein each of the n peak positions has n corresponding elements within the n×n matrix, and the SNR decision unit generates the SNR value for each peak position from the ratio of a diagonal entry in the n×n matrix corresponding to the peak position with the sum of all other (n−1) entries in the n×n matrix corresponding to the peak position.

18. The wireless of claim 17 wherein the SNR decision unit sets the SNR value for a peak position to a minimum value if any of the (n−1) entries in the n×n matrix corresponding to the peak position exceeds the diagonal entry corresponding to the peak position.

19. The wireless device of claim 18 wherein the minimum value is zero.

* * * * *

UNITED STATES PATENT AND TRADEMARK OFFICE
CERTIFICATE OF CORRECTION

| | | |
|---|---|---|
| PATENT NO. | : 7,224,718 B2 | Page 1 of 1 |
| APPLICATION NO. | : 10/462795 | |
| DATED | : May 29, 2007 | |
| INVENTOR(S) | : Chun-Jung Chang et al. | |

It is certified that error appears in the above-identified patent and that said Letters Patent is hereby corrected as shown below:

On the Title Page, Item (75), Inventors, first inventor's residence should be corrected from "Taipei (TW)" to -- Kao-Hsiung (TW) --

Signed and Sealed this

Twenty-first Day of October, 2008

JON W. DUDAS
*Director of the United States Patent and Trademark Office*